United States Patent
Nunnink et al.

(10) Patent No.: US 6,681,993 B1
(45) Date of Patent: Jan. 27, 2004

(54) METHOD AND DEVICE FOR READING OF A BARCODE ON AN ARTICLE

(75) Inventors: Laurentius Wilhelmus Nunnink, Amersfoort (NL); Cornelis Reinier Johannes Schonenberg, Amersfoort (NL)

(73) Assignee: Scantech-ID Holding B.V., An Soesterberg (NL)

( * ) Notice: Subject to any disclaimer, the term of this patent is extended or adjusted under 35 U.S.C. 154(b) by 0 days.

(21) Appl. No.: 09/462,036
(22) PCT Filed: Jun. 25, 1998
(86) PCT No.: PCT/NL98/00366
§ 371 (c)(1), (2), (4) Date: Apr. 11, 2000
(87) PCT Pub. No.: WO99/01839
PCT Pub. Date: Jan. 14, 1999

(30) Foreign Application Priority Data

Jul. 2, 1997 (NL) .............................................. 1006454

(51) Int. Cl.[7] .......................... G02B 26/00; G02B 5/08; G06K 7/10
(52) U.S. Cl. ............................ 235/462.38; 235/462.43; 235/462.01; 235/462.31; 235/462.36
(58) Field of Search .................. 235/42.14, 462.22, 235/462.32, 462.34, 462.4, 462.08, 462.17, 462.2, 462.3, 462.36, 462.38, 462.42, 462.43, 454

(56) References Cited

U.S. PATENT DOCUMENTS

| | | | | |
|---|---|---|---|---|
| 4,918,297 A | * | 4/1990 | Kurimoto | ................... 235/383 |
| 5,446,267 A | * | 8/1995 | Stanzani et al. | ............. 235/440 |
| 5,491,328 A | | 2/1996 | Rando | ......................... 235/462 |
| 5,525,786 A | | 6/1996 | Dumont | ...................... 235/462 |
| 5,744,815 A | * | 4/1998 | Gurevich et al. | ........... 250/566 |
| 5,988,502 A | * | 11/1999 | Krichever et al. | ........... 235/454 |
| 6,216,953 B1 | * | 4/2001 | Kumagai et al. | ....... 235/472.01 |
| 6,325,289 B1 | * | 12/2001 | Mazzone | ............... 235/462.14 |
| 6,435,413 B1 | * | 8/2002 | Kumagai et al. | ....... 235/462.45 |
| 6,446,870 B1 | * | 9/2002 | Rando | .................... 235/462.43 |
| 6,462,880 B1 | * | 10/2002 | Ohkawa et al. | ............. 359/629 |

FOREIGN PATENT DOCUMENTS

| | | |
|---|---|---|
| EP | 0444958 | 9/1991 |
| EP | 0492065 | 7/1992 |
| EP | 0572685 | 12/1993 |
| EP | 0663643 | 7/1995 |

* cited by examiner

Primary Examiner—Michael G. Lee
Assistant Examiner—Daniel Walsh
(74) Attorney, Agent, or Firm—Webb Ziesenheim Logsdon Orkin & Hanson, P.C.

(57) ABSTRACT

The present invention comprises a device for reading a code on an article, comprising: a housing provided with at least two windows for passage of radiation which are disposed at a relative mutual angle; radiation source means for transmitting radiation to the article, which radiation source means are arranged in the housing and comprise at least two separate radiation sources; a rotatable polygonal mirror for reflecting radiation coming from the radiation source means; a number of fixedly disposed mirrors for reflecting through the respective windows the radiation coming from the polygonal mirror; and detection means for detecting the radiation scattered by the code.

14 Claims, 11 Drawing Sheets

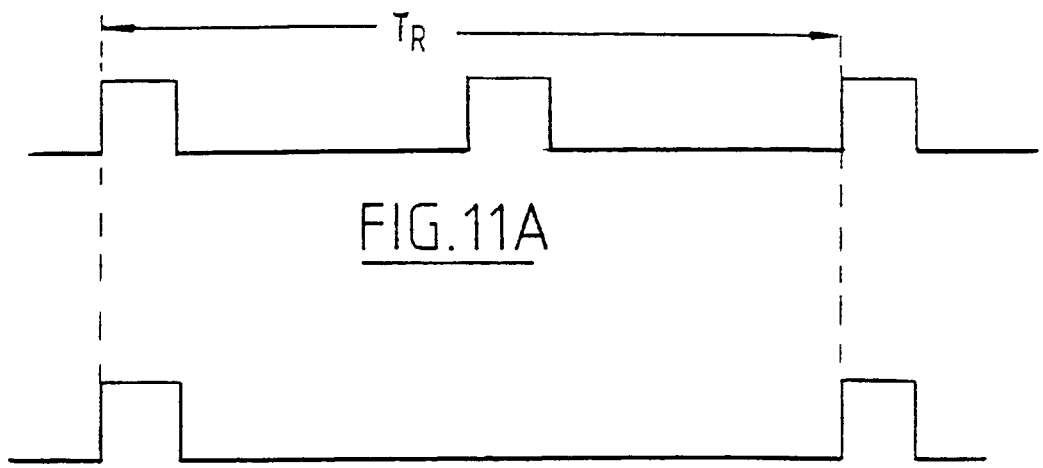
FIG.11A
FIG.11B
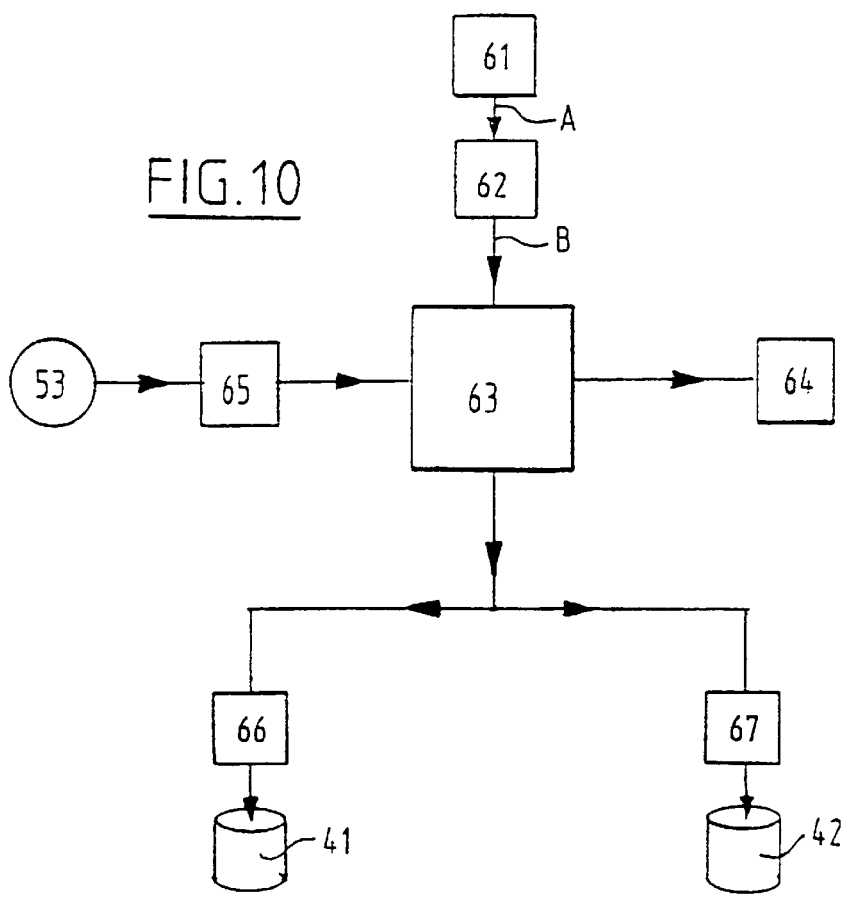
FIG.10

METHOD AND DEVICE FOR READING OF A BARCODE ON AN ARTICLE

BACKGROUND OF THE INVENTION

The present invention relates to a device and method ergonomically suitable for users for reading a code, such as a bar code, on, or scanning of, an article, wherein radiation is projected onto the article, from two sides, thereby preventing the person holding the article from having to turn it with awkward wrist movements.

Such devices are per se known, and the present invention has for its object to improve this invention, particularly in the sense that interruption of the reading process at the end of the lifespan of the laser is precluded and/or further possibilities are created by making wavelengths and/or focus points of both radiation sources mutually different.

SUMMARY OF THE INVENTION

The present invention comprises a device for reading a code on an article, comprising:

a housing provided with at least two windows for passage of radiation which are disposed at a relative mutual angle;

radiation source means for transmitting radiation to the article, which radiation source means are arranged in the housing and comprise at least two separate radiation sources;

a rotatable polygonal mirror for reflecting radiation coming from the radiation source means;

a number of fixedly disposed mirrors for reflecting through the respective windows the radiation coming from the polygonal mirror; and detection means for detecting the radiation scattered by the code.

In the preferred embodiment wherein the radiation sources each transmit radiation of a different wavelength, it is possible in the case that one of the two wavelengths has difficulty in distinguishing the bar code from the background that the code can still be recognized using other wavelengths.

As a result of the preferred embodiment wherein each of the radiation sources is focussed at a different distance relative to the window, the area within which bar codes can be effectively scanned is enlarged.

The present invention further provides a method wherein the device according to the present invention is applied.

In each of the two above stated preferred embodiments the scanning potential is increased, whereby the movement of the article during the scanning movement by for instance a check-out operator requires the least possible adjustment, whereby the ergonomics are improved further.

In a further preferred embodiment the radiation sources each have a different polarization direction. In many cases the material of the bar code is sensitive to the polarization of the incident laser light such that a stronger reflection is obtained for one of the two radiation sources. It is then possible to take into account in the microprocessor for which polarization direction the best score of bar code recognition is obtained so that this can be switched ON more often than the other radiation source.

As much use as possible is preferably made of symmetrical scan patterns since, from a statistical viewpoint, there is no preference for the direction of the bar code. The scan lines are projected alternately whenever possible through each of the two windows. This further enables the use of the same components for a horizontal and a vertical window with fixed mirrors. It is however possible to suffice with a single polygonal mirror and sensor with associated analog electronics.

Finally, the present invention provides a number of co-acting devices according to the present invention, whereby a passage is obtained for scanning articles on all sides, for instance articles supplied on a conveyor.

BRIEF DESCRIPTION OF THE DRAWINGS

Further advantages, features and details of the present invention will be elucidated on the basis of the following description of preferred embodiments thereof with reference to the annexed drawing, in which:

FIG. 10 shows a diagram of a preferred embodiment of the device according to the present invention;

FIGS. 11A and 11B show signals in the arrangement of FIG. 10; and

DETAILED DESCRIPTION OF THE PREFERRED EMBODIMENTS

Figure 1:
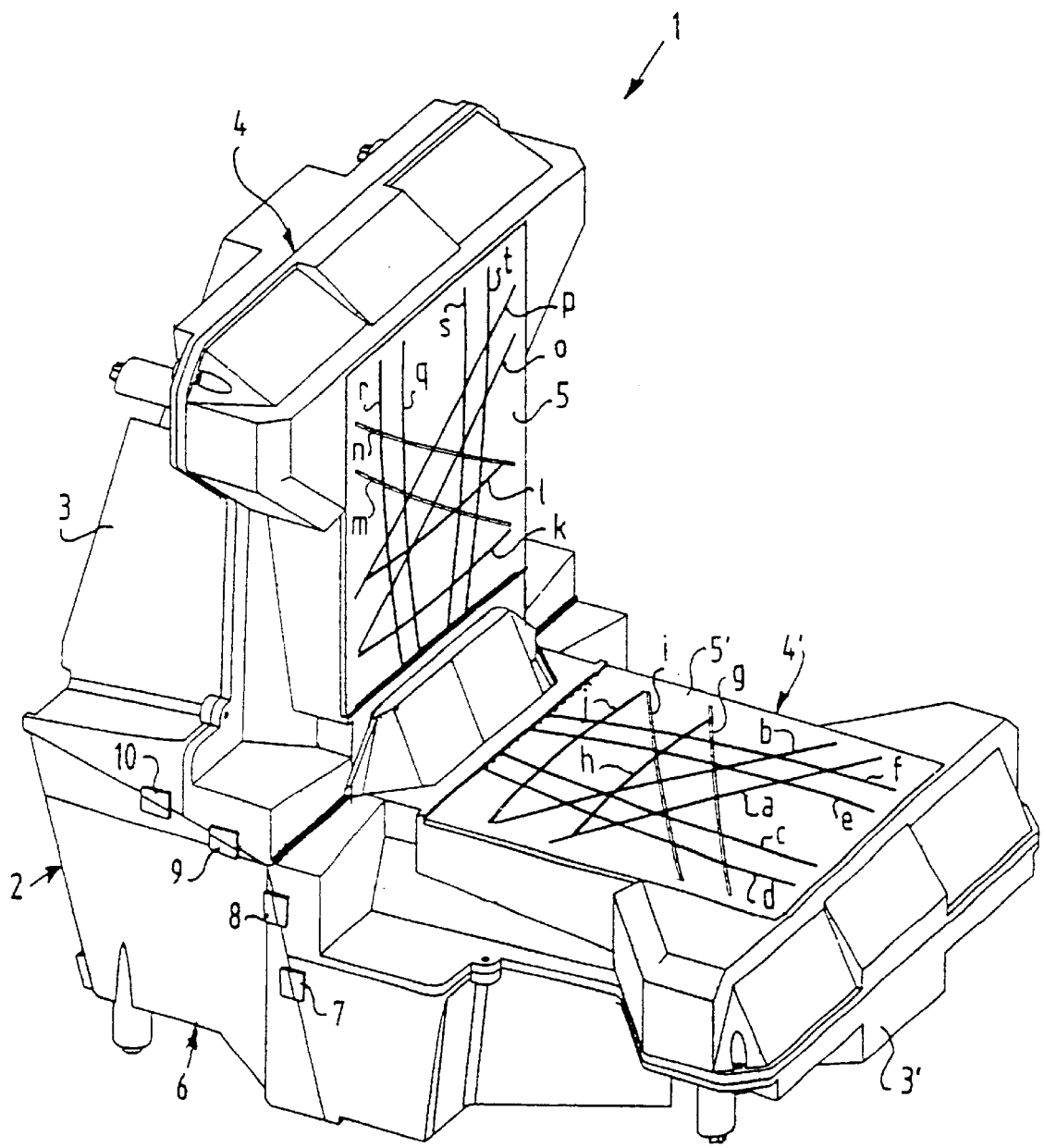
FIG. 1 shows a view in perspective of a preferred embodiment of a device according to the present invention.

A device 1 (FIG. 1) comprises a housing which is preferably constructed from identically shaped injection moulded components 3, 4 respectively 3', 4', wherein in components 4, 4' are arranged windows 5, 5' for passage of scanning scan lines a, b, c, d, e, f, g, h, i, j, k, l, m, n, o, p, q, r, s respectively t.

The moving parts and the electronic components are arranged as far as possible in a corner par 6 of the housing. For rapid assembly, in addition to several screw connections between the parts 3, 3' respectively 4, 4' and the corner part 8, slide elements 7, 8, 9, 10 are arranged for quick sliding together of the different components. Assembly is speeded up by omitting screw connections; the slide elements can likewise be injection moulded.

Figure 2:
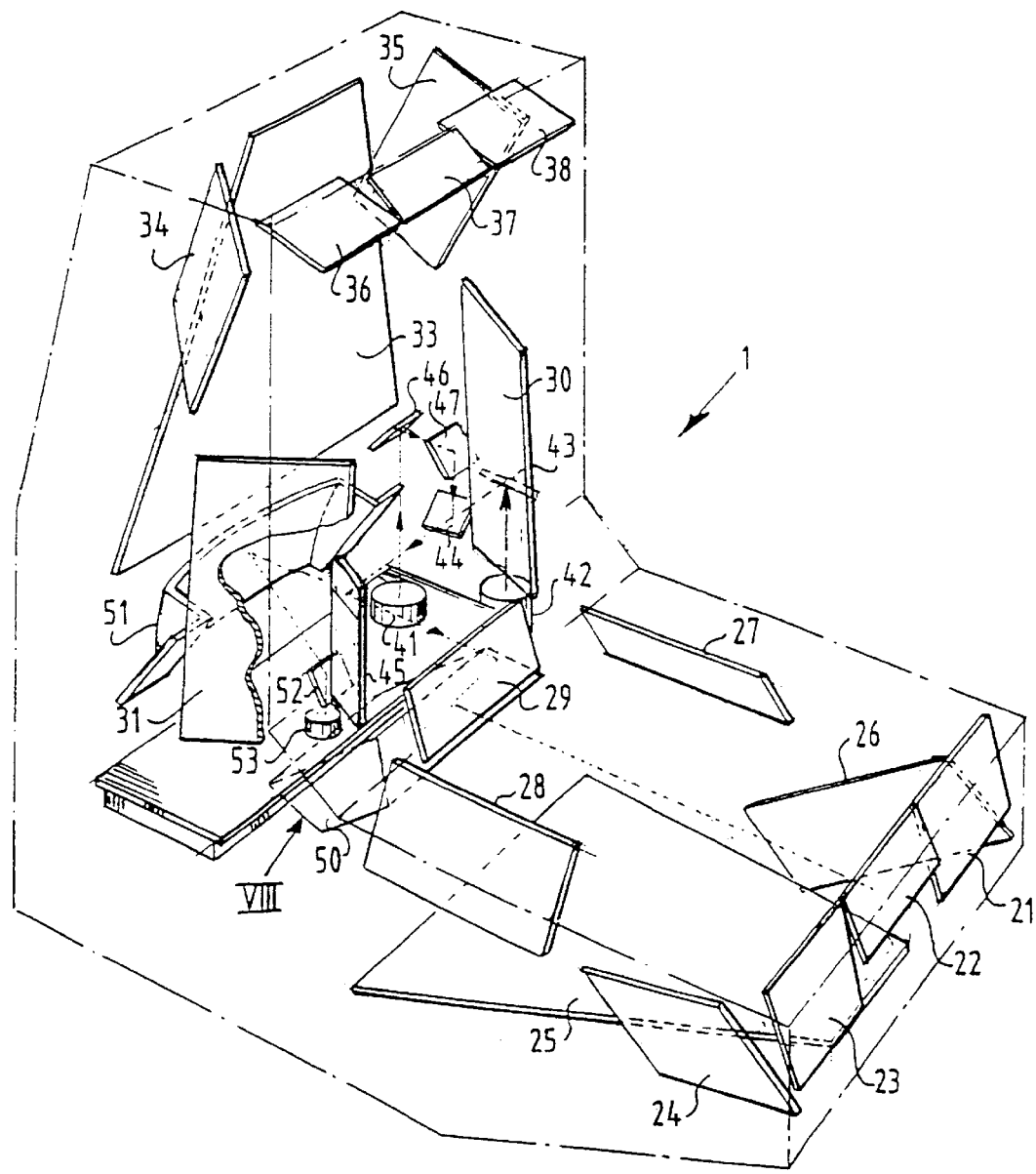
FIG. 2 shows a schematic view in perspective of a device of FIG. 1.

As can be seen particularly in FIG. 2, a number of fixedly disposed mirrors 21, 22, 23, 24, 25, 26, 27, 28, 29, 30, 31, 33, 34, 35, 36, 37, 38 are situated in the interior of housing 1. Further arranged in corner part 6 are two laser sources 41 respectively 42, the radiation of which is projected onto a fixed mirror 45 via further fixed mirrors 43, 44 (to the greatest possible extent reflective for the one laser and transparent for the other). The optical axes of both laser sources thus coincide as much as possible. The radiation from source 41 is projected via fixed mirrors 46, 47 and 44 onto mirror 45. The radiation from both laser beams is projected onto the rotating mirror 50 which, depending on the position of the side surfaces thereof, projects radiation onto the fixed mirrors 21–28 or onto the fixed mirrors 30–38.

The radiation scattered by the bar code on the article (not shown) reaches detector 53 via the same optical paths via focussing mirror 51 and fixed mirror 52.

In the present preferred embodiment the radiation from laser source 41 has a wavelength of about 820 nm, while the wavelength of the laser light from laser source 42 amounts to about 670 nm. The focus points preferably also differ mutually, for instance with a difference of about 7 cm, so that the area of maximum detection of bar codes differs slightly for each of the two laser beams.

The different wavelength is of particular importance in cases wherein for a determined wavelength the distinction between bar code and background is insufficient. It is possible in a manner not shown to switch between the laser sources, for instance it is possible to switch between the laser sources at a fixed location during rotation of the mirror.

Figure 3A:
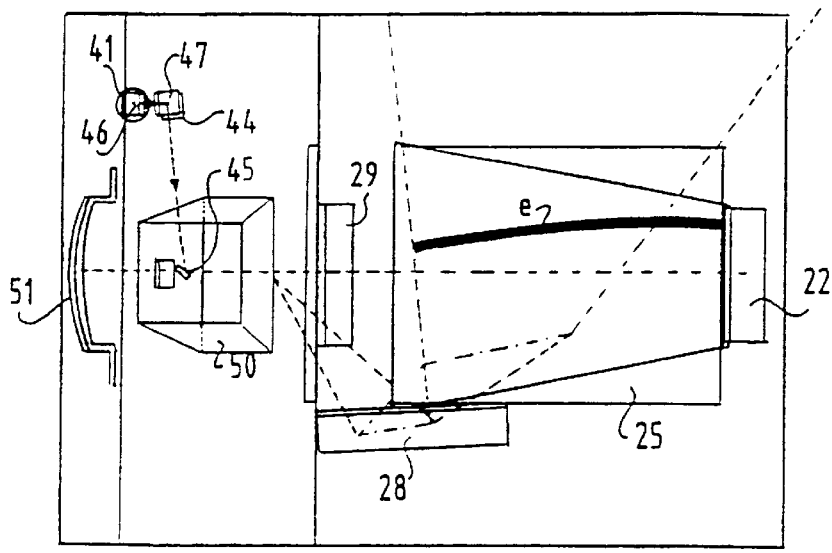
FIGS. 3A, 3B show respectively a top view and a view in cross-section of the device shown in FIGS. 1 and 2 to illustrate a first scan line.
Figure 3B:
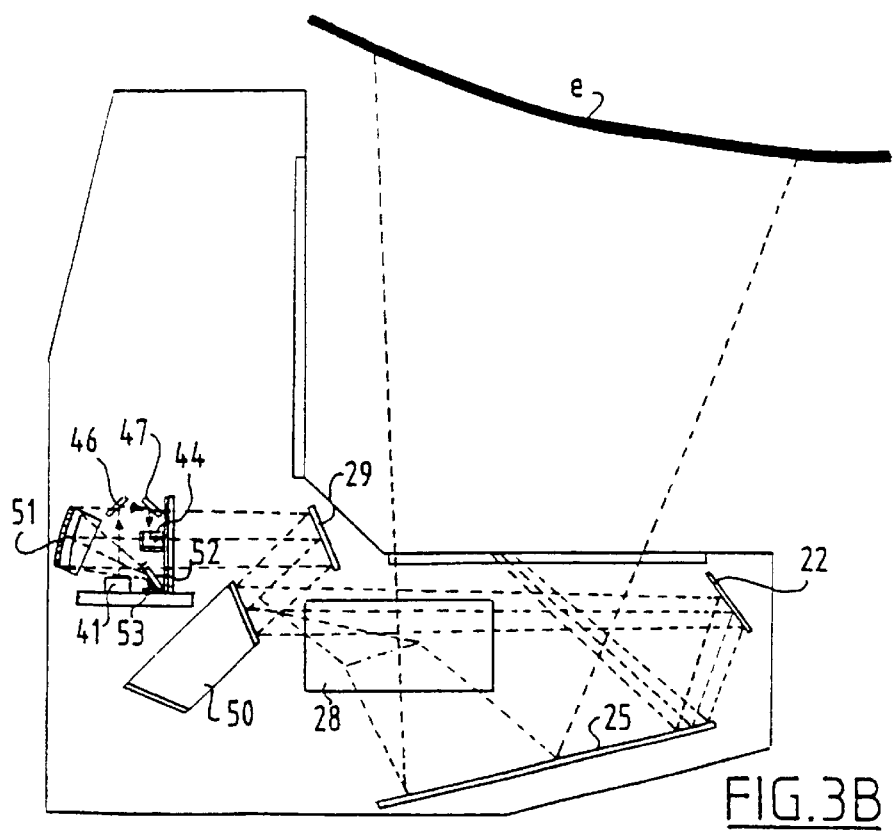

FIGS. 3A and 3B show in top view and side view how a line, for instance e, is projected from laser source 41 via mirrors 46, 47, 44, 45 and 29 onto polygonal rotatable mirror 50, from where the line e is written using mirrors 28 and 25. The radiation scattered by a bar code is received via the same optical path by a focussing mirror 51 and detected on detector 53 via fixed mirror 52.

Figure 4A:
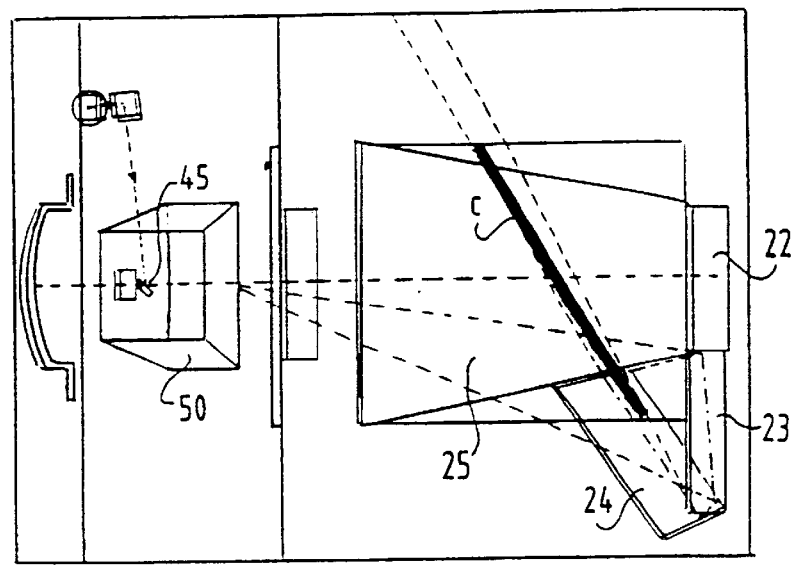
FIGS. 4A, 4B show respectively a top view and a view in cross-section of the device shown in FIGS. 1 and 2 to illustrate a second scan line.
Figure 4B:
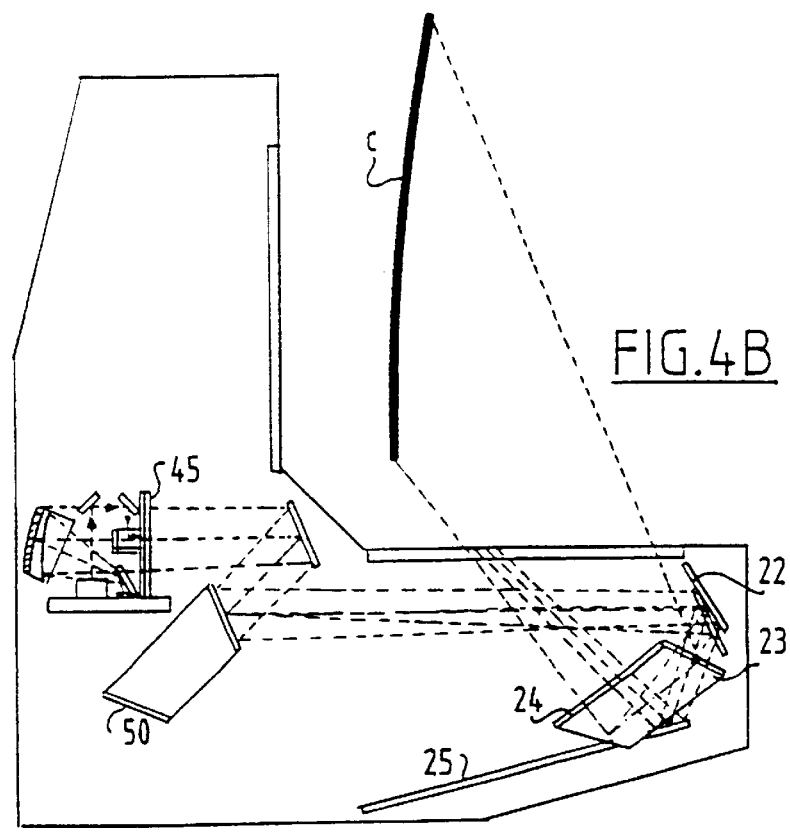

Line c (FIGS. 4A, 4B) is written in similar manner from rotating mirror 50 via mirrors 23 and 24.

Figure 5A:
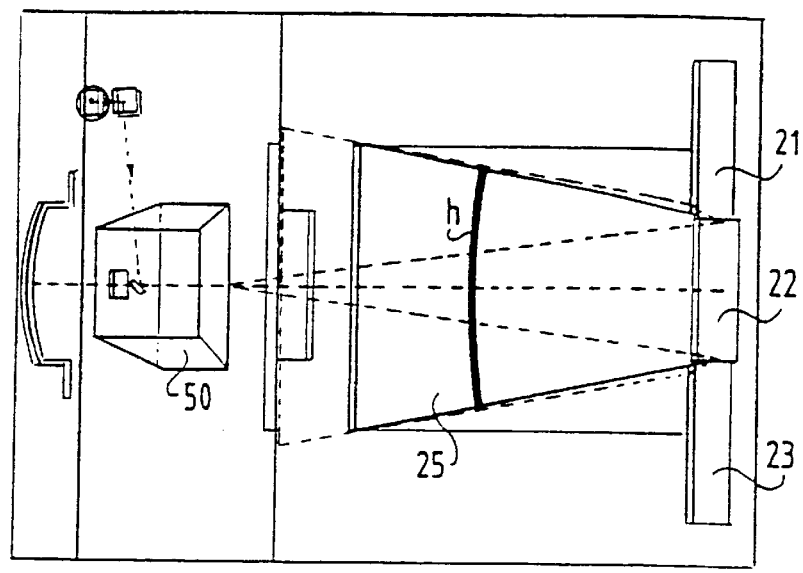
FIGS. 5A, 5B show respectively a top view and a view in cross-section of the device shown in FIGS. 1 and 2 to illustrate a third scan line.
Figure 5B:
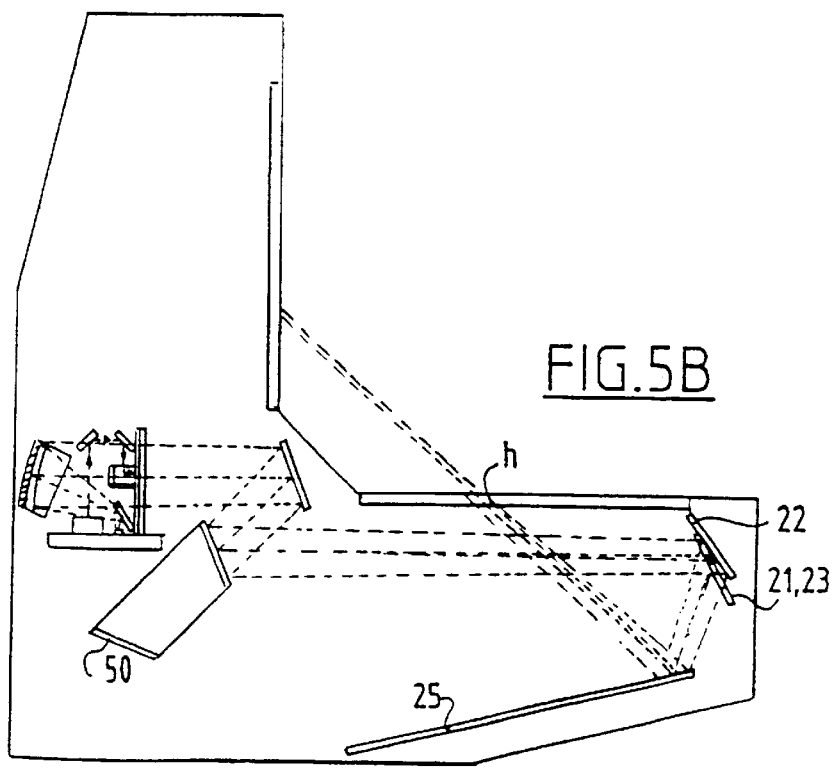

A line such as h (FIGS. 5A, 5B) is written from mirror 50 via mirrors 22 and 25.

Figure 6A:
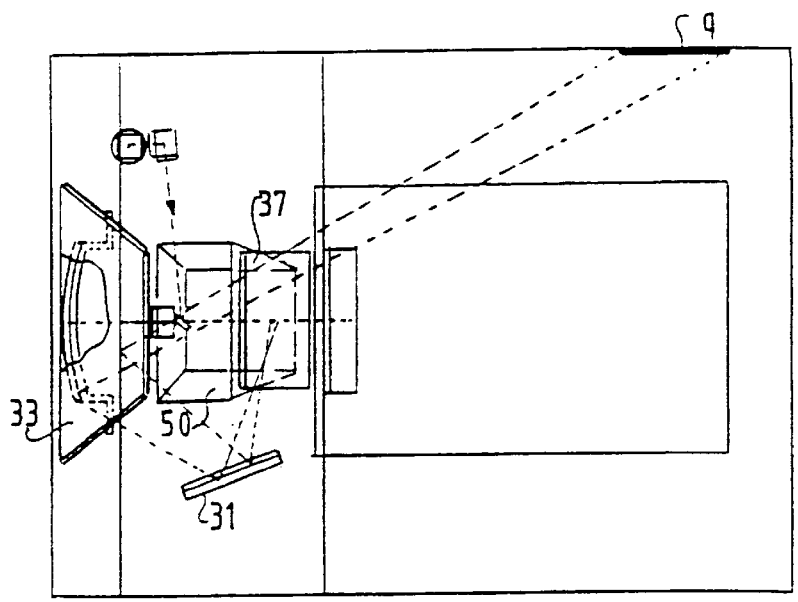
FIGS. 6A, 6B show respectively a top view and a view in cross-section of the device shown in FIGS. 1 and 2 to illustrate a fourth scan line.
Figure 6B:
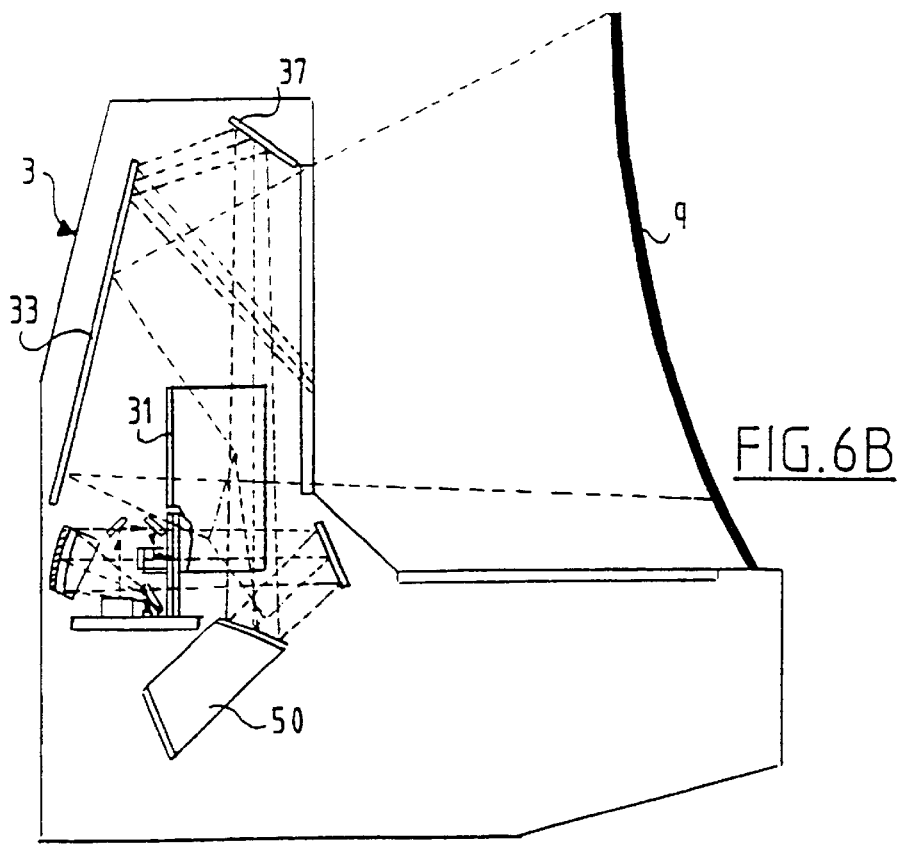

FIGS. 6A, 6B shows a line such as q which is written from the housing part 3 from rotatable mirror 50 using fixed mirrors 33 and 31.

Figure 7A:
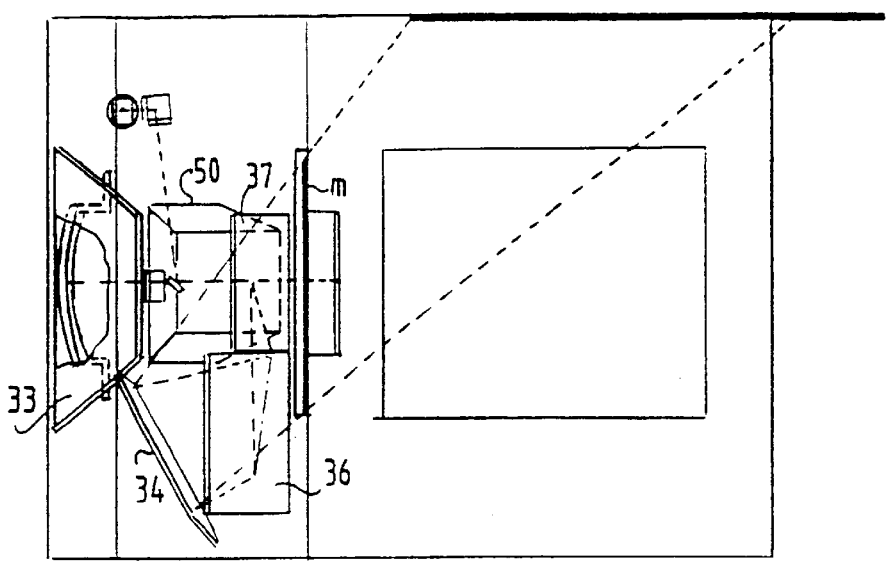
FIGS. 7A, 7B show respectively a top view and a view in cross-section of the device shown in FIGS. 1 and 2 to illustrate a fifth scan line.
Figure 7B:
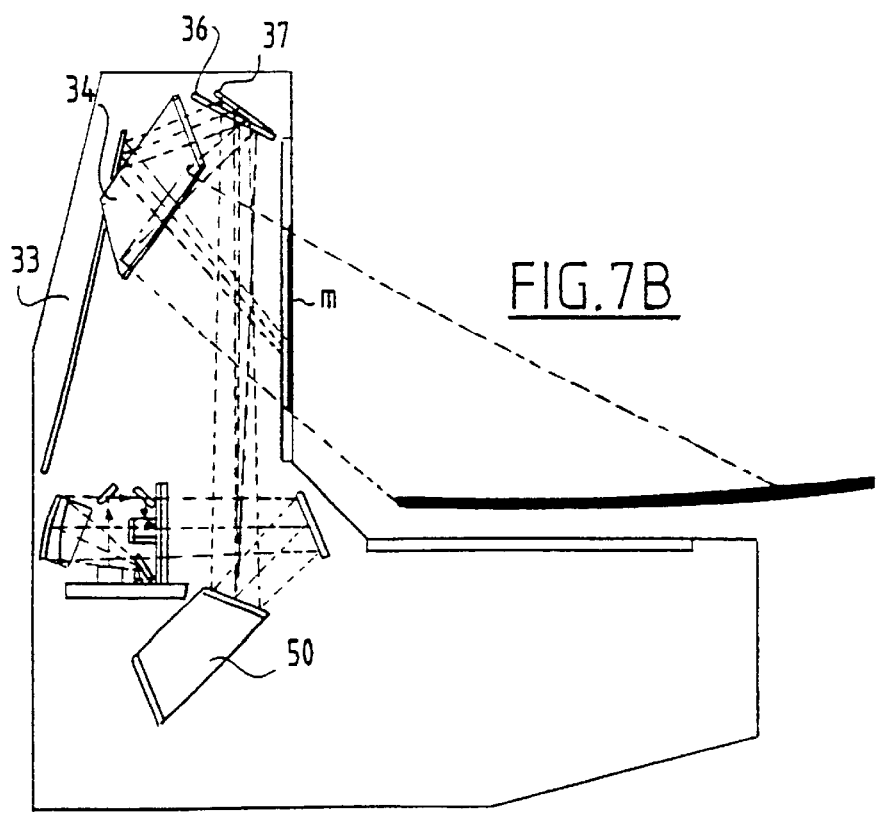

In similar manner FIG. 7A shows a line such as m which is written from rotatable mirror 50 via mirror 36.

Figure 8:
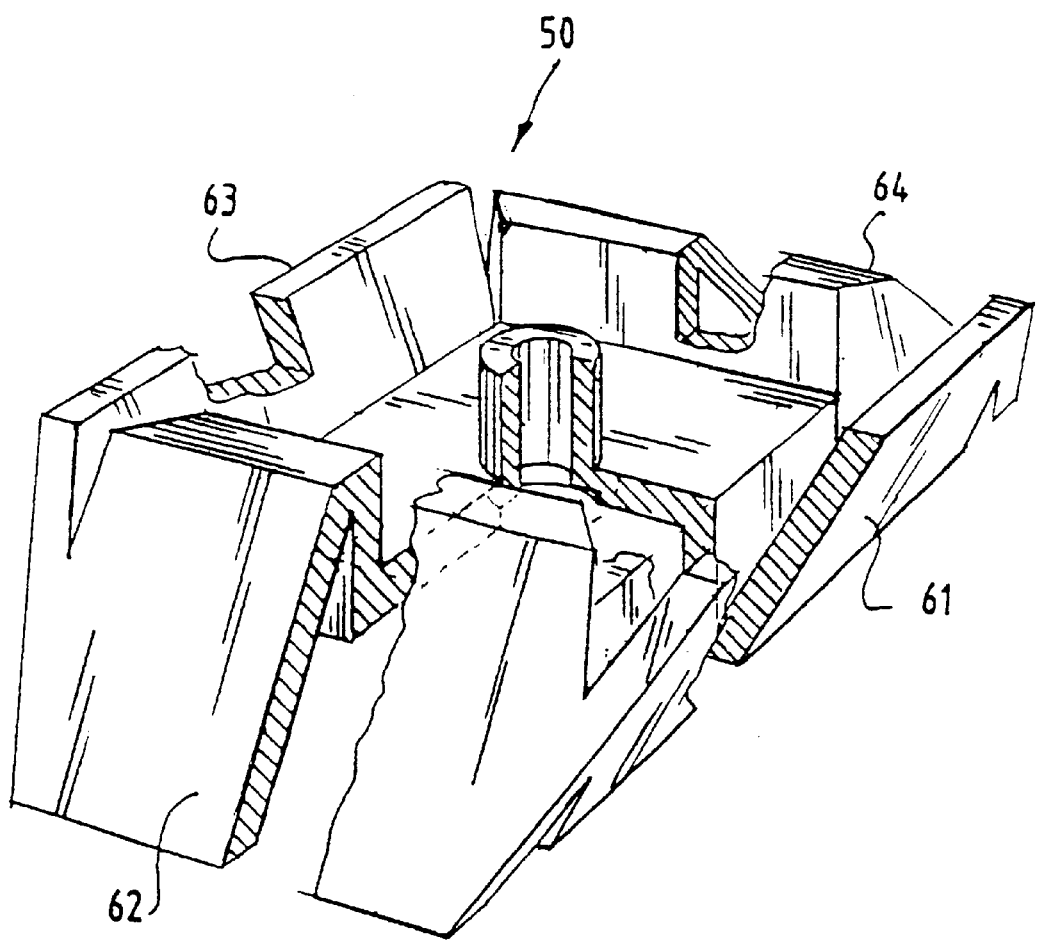
FIG. 8 is a view in perspective of detail VIII in FIG. 2.

FIG. 8 shows the rotatable mirror 50 which is preferably manufactured from plastic with vapour-deposited mirror surfaces and with which the diverse lines are written alternatingly per mirror surface 61, 62, 63, 64 from the lower window and the upper window.

Figure 9:
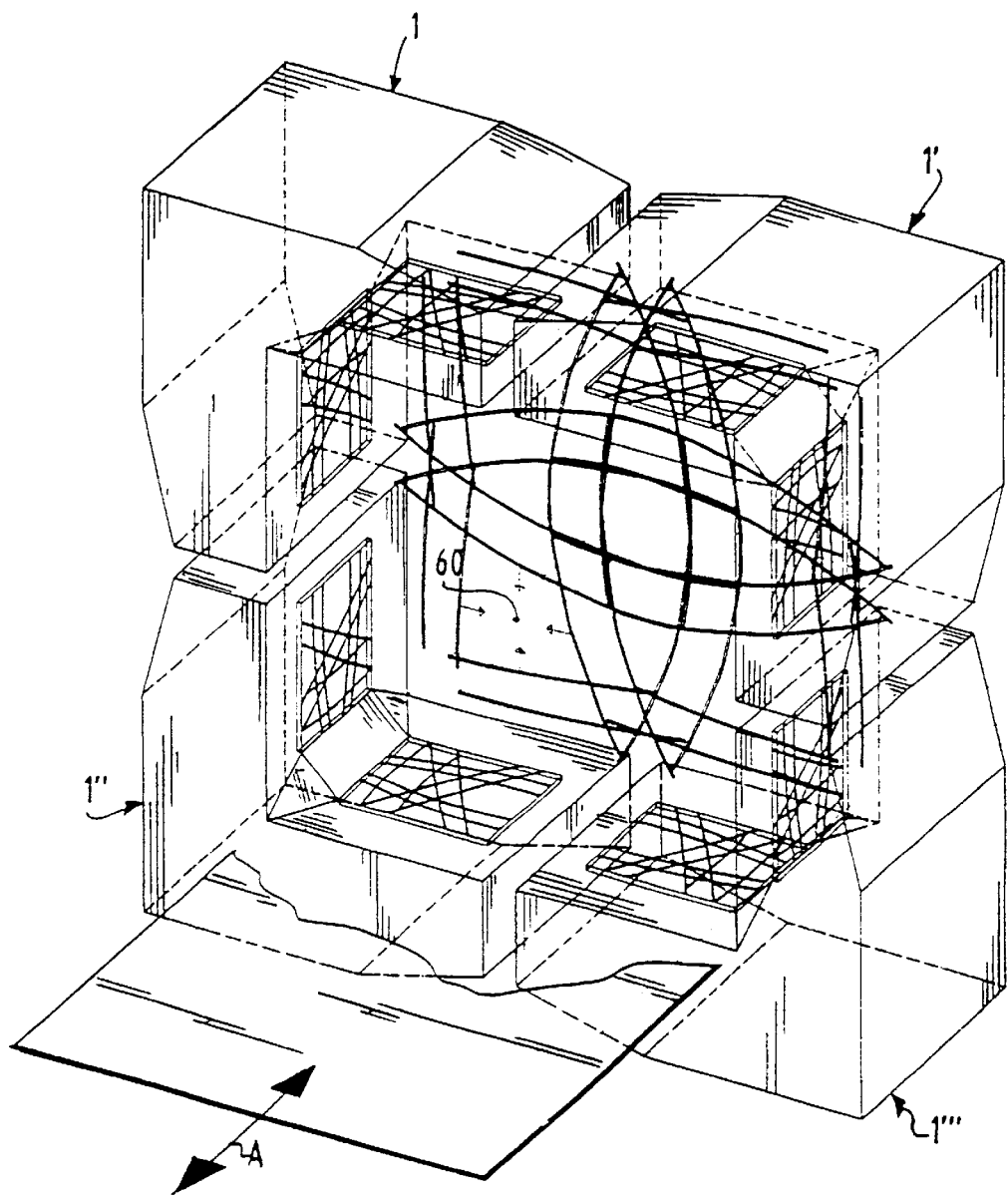
FIG. 9 is a schematic view in perspective of four devices according to the present invention wherein a tunnel is formed for scanning of an article on all sides.
Figure 12:
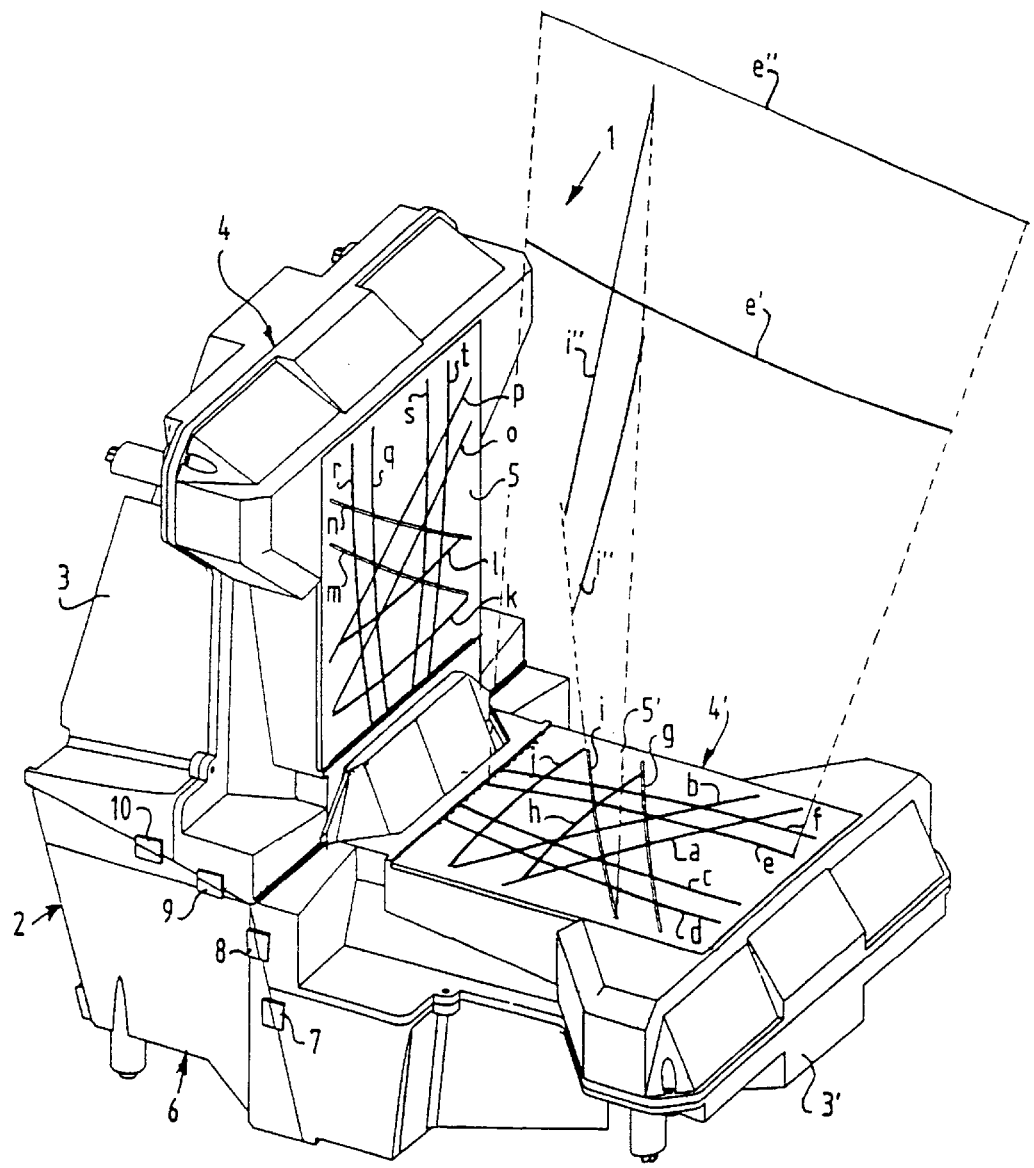
FIG. 12 is a view elucidating the increase in the scanning area in a preferred embodiment of the device according to the present invention.

In FIG. 9 is shown an arrangement wherein four devices according to the present invention 1, 1', 1", 1'" are placed in a compact arrangement whereby an internal tunnel 60 is formed, inside which an article is transported in and out as according to arrow A or therethrough, so that an article can be scanned from all sides.

The preferred embodiment described in FIGS. 1 and 2 further preferably comprises a drive motor 61 for driving the polygon, the output signal A of which is connected to a means for dividing by two 62 since in this preferred embodiment a pulse is generated by motor 61 at each half-rotation, as indicated in FIG. 11A in which a time period $t_R$ is shown. Multiplication by the signal from the means for dividing by two 62 (FIG. 113) results in the signal C as according to FIG. 11B, which is fed to a microprocessor 63 which is connected to a so-called host computer 64. Sensor 53 detects the radiation and generates an analog signal which is converted in converter part 65 into a digital decoding signal which is likewise fed to microprocessor 63. This latter further generates control signals to drive elements 66 and 67 for driving of lasers 41 and 42.

In a manner not shown, the quadrangular polygon and the motor are both provided with a marking which are placed one above the other during assembly. The position of the polygon is hereby calibrated relative to the motor pulse as shown in FIG. 11A.

A great number of options are thus possible for ON/OFF switching of the two laser sources. In a first preferred embodiment the polygon is for instance switched alternatingly at each half-rotation so that, as the surfaces of the polygon have a differing position at each quarter-turn, two lines are written in each case by one laser, one of these through the horizontal window and one through the vertical window. Thus ensured continuously to the best possible extent is that all pattern lines are present in the space to be scanned.

As noted earlier, laser sources 41 and 42 can have radiation with differing polarization direction, differing wavelengths and/or different focus points. In determined conditions one of the two laser sources will hereby achieve a better score in recognition of a bar code or bar code half. It is also quite conceivable for a first bar code half to be detected by radiation from the first laser source while a second bar code half is scanned by the other laser source.

By now recording in the microprocessor which of the two laser sources achieves the best "score" in recognizing a bar code, the switching of the laser sources can be changed, for instance to a ratio of 1:3 or 1:5, so that the laser source with the highest score is switched ON more often.

What is claimed is:

1. A device for reading a code on an article, comprising:
    a housing provided with at least two windows for passage of radiation which are disposed at a relative mutual angle;
    radiation source means for transmitting radiation to the article, which radiation source means are arranged in the housing and include at least a first radiation source and a separate second radiation source, wherein each of the radiation sources provides a line pattern through each of the windows and the axes of the radiation sources are substantially coincident during at least a portion of the reading process;
    a rotatable polygonal mirror for reflecting radiation coming from the radiation source means;
    a plurality of fixedly disposed mirrors for reflecting through the respective windows the radiation coming from the polygonal mirror;
    detection means for detecting the radiation scattered by the code; and
    control means for either switching on the first radiation source and switching off the second radiation source or switching off the first radiation source and switching on the second radiation source, wherein the radiation source which is switched on provides only one line of said line pattern at a time through one single window, and wherein subject to the number of correct scans using one of the two radiation sources, this radiation source is switched on more often than the other.

2. The device as claimed in claim 1, wherein the first radiation source generates radiation with a first polarization direction while a second radiation source generates radiation with a polarization direction differing from the first polarization direction.

3. The device as claimed in claim 1, wherein each of the radiation sources is focused at a different distance relative to the window.

4. The device as claimed in claim 3, wherein the difference in focus point is about 7 cm.

5. The device as claimed in claim 1, wherein the radiation sources each transmit radiation of a different wavelength.

6. The device as claimed in claim 5, wherein the wavelength of the first radiation source is about 820 nm and that of the second radiation source is about 670 nm.

7. The device as claimed in claim 1, including a single detector and a single drive motor for driving the mirror.

8. The device as claimed in claim 1, wherein the operation of each of the laser sources is switched ON/OFF by means of a pulse from a drive motor for driving the polygonal mirror.

9. The device as claimed in claim 1, wherein the pattern of scan lines on the first window substantially corresponds with the pattern of scan lines on the second window.

10. The device as claimed in claim 1, wherein the rotatable polygonal mirror is embodied such that scan lines are projected alternatingly through the first and the second window.

11. The device as claimed in claim 1, wherein the housing includes a plurality of injection moulded components, two of which form in each case the housing part in which are arranged the fixed mirrors for a scan pattern as well as the window.

12. The device as claimed in claim 1, wherein the housing parts can be mutually fixed with one or more sliding members.

13. An apparatus comprising a number of devices as claimed in claim 1, which devices are placed relative to each other such that a tunnel space is created.

14. The apparatus as claimed in claim 13, further including a transporting member for transporting articles with codes in and out of the tunnel space.

* * * * *